US011636352B2

(12) United States Patent
Moreno Sierra et al.

(10) Patent No.: US 11,636,352 B2
(45) Date of Patent: Apr. 25, 2023

(54) INTEGRATED ADVANCED VISUALIZATION TOOL FOR GEOSTEERING UNDERBALANCED COILED TUBING DRILLING OPERATIONS

(71) Applicant: Saudi Arabian Oil Company, Dhahran (SA)

(72) Inventors: Ferney Geovany Moreno Sierra, Bogota (CO); Ahmad Azly Bin Abdul Aziz, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 398 days.

(21) Appl. No.: 15/931,194

(22) Filed: May 13, 2020

(65) Prior Publication Data

US 2021/0357777 A1 Nov. 18, 2021

(51) Int. Cl.
*G06N 5/04* (2023.01)
*G06N 20/00* (2019.01)
(Continued)

(52) U.S. Cl.
CPC ............... *G06N 5/04* (2013.01); *E21B 7/04* (2013.01); *E21B 21/085* (2020.05); *E21B 45/00* (2013.01);
(Continued)

(58) Field of Classification Search
CPC .......... G06N 5/04; G06N 20/00; E21B 45/00; E21B 47/06; E21B 49/003; E21B 49/005; G01V 99/005
(Continued)

(56) References Cited

U.S. PATENT DOCUMENTS 4,541,490 A 9/1985 Bigbie et al.
5,076,356 A 12/1991 Reimert
(Continued)

FOREIGN PATENT DOCUMENTS

WO 2016101374 6/2016
WO WO-2021231535 A1 * 11/2021 ........... E21B 21/085

OTHER PUBLICATIONS

Guizada et al. (Application of Underbalanced Coiled Tubing Drming Technology to Enhance Gas Production in Deep Carbonate Reservoirs, Society of Petroleum Engineers, 2016, pp. 1-8) (Year: 2016).*

(Continued)

*Primary Examiner* — Iftekhar A Khan
(74) *Attorney, Agent, or Firm* — Fish & Richardson P.C.

(57) ABSTRACT

Systems and methods include a method for providing an integrated advanced visualization tool for geosteering underbalanced coiled tubing drilling (UBCTD) operations. Drilling operation data is received from different sources in real time during a drilling operation. The drilling operation data includes geological formation information recorded during the drilling operation, micropalaeontological test results of the drilling operation, drilling parameters being used during the drilling operation, cumulative productivity index calculations, and reservoir pressure information of reservoirs encountered during the drilling operation. The drilling operation data is analyzed to correlate elements of the drilling operation data by time and cumulative depth. A graph is generated in real time that includes multiple plots correlated as a function of cumulative depth over time.

20 Claims, 9 Drawing Sheets

(51) Int. Cl.
   *E21B 21/08* (2006.01)
   *E21B 7/04* (2006.01)
   *E21B 45/00* (2006.01)
   *E21B 47/06* (2012.01)
   *E21B 49/00* (2006.01)
   *G01V 99/00* (2009.01)

(52) U.S. Cl.
   CPC ............ *E21B 47/06* (2013.01); *E21B 49/003* (2013.01); *E21B 49/005* (2013.01); *G01V 99/005* (2013.01); *G06N 20/00* (2019.01); *E21B 2200/20* (2020.05)

(58) Field of Classification Search
   USPC .......................................................... 706/11
   See application file for complete search history.

(56) References Cited

U.S. PATENT DOCUMENTS

| | | | |
|---|---|---|---|
| 6,491,108 B1 | 12/2002 | Slup et al. | |
| 6,754,588 B2* | 6/2004 | Cross | G01V 11/00 702/11 |
| 6,823,298 B1* | 11/2004 | Jones | E21B 49/00 703/10 |
| 7,606,666 B2* | 10/2009 | Repin | E21B 49/00 702/9 |
| RE41,508 E | 8/2010 | Treece | |
| 7,828,060 B2 | 11/2010 | Churchill | |
| 7,881,155 B2 | 2/2011 | Close | |
| 8,463,549 B1* | 6/2013 | Selman | E21B 7/04 702/9 |
| 8,498,848 B2* | 7/2013 | Habashy | E21B 43/00 703/10 |
| 9,835,009 B2 | 12/2017 | Hess et al. | |
| 10,260,319 B2* | 4/2019 | Sarduy | E21B 49/00 |
| 10,487,587 B2 | 11/2019 | Cummins | |
| 10,570,707 B2* | 2/2020 | Revheim | E21B 49/00 |
| 10,890,066 B1* | 1/2021 | Ibrahim | E21B 49/08 |
| 10,968,730 B2* | 4/2021 | Wang | E21B 21/08 |
| 11,352,879 B2* | 6/2022 | Li | G01N 33/241 |
| 2006/0090934 A1* | 5/2006 | Williams | E21B 7/04 175/45 |
| 2006/0161406 A1* | 7/2006 | Kelfoun | G01V 11/00 703/10 |
| 2006/0241867 A1* | 10/2006 | Kuchuk | E21B 49/00 324/303 |
| 2007/0016389 A1* | 1/2007 | Ozgen | E21B 49/00 703/10 |
| 2008/0172272 A1* | 7/2008 | Back | G06Q 10/0637 705/7.36 |
| 2008/0289877 A1* | 11/2008 | Nikolakis-Mouchas | E21B 44/00 702/9 |
| 2009/0119082 A1* | 5/2009 | Fitzpatrick | G01V 11/00 703/10 |
| 2010/0059220 A1 | 3/2010 | Wilberg et al. | |
| 2011/0098931 A1 | 4/2011 | Kosmala et al. | |
| 2011/0161133 A1* | 6/2011 | Staveley | E21B 44/00 705/7.11 |
| 2012/0048618 A1 | 3/2012 | Zamanian et al. | |
| 2013/0124171 A1* | 5/2013 | Schuette | E21B 43/16 703/2 |
| 2013/0140088 A1* | 6/2013 | Williams | E21B 7/06 175/45 |
| 2013/0144531 A1* | 6/2013 | Johnston | E21B 44/00 702/9 |
| 2013/0311096 A1* | 11/2013 | Greer | G01N 30/88 175/48 |
| 2014/0124265 A1 | 5/2014 | Al-Yami et al. | |
| 2014/0209383 A1 | 7/2014 | Vuyk | |
| 2015/0012219 A1 | 1/2015 | Selman | |
| 2015/0060054 A1* | 3/2015 | Bordoloi | E21B 43/00 166/250.01 |
| 2015/0168286 A1* | 6/2015 | Mikhailov | G01N 29/07 73/152.07 |
| 2015/0218888 A1* | 8/2015 | Schonberger | E21B 44/00 175/24 |
| 2015/0240616 A1* | 8/2015 | Woodward | G05B 15/02 700/275 |
| 2016/0169856 A1* | 6/2016 | Sung | G01N 33/24 703/10 |
| 2017/0096881 A1* | 4/2017 | Dusterhoft | G06N 20/00 |
| 2017/0167254 A1* | 6/2017 | Fotland | G01V 99/005 |
| 2017/0205531 A1* | 7/2017 | Berard | G01V 11/00 |
| 2017/0335665 A1* | 11/2017 | Saleh | E21B 43/168 |
| 2018/0202264 A1* | 7/2018 | Sarduy | E21B 43/00 |
| 2018/0238148 A1* | 8/2018 | Canady | G06F 17/10 |
| 2018/0266245 A1* | 9/2018 | Gillan | E21B 7/06 |
| 2018/0334896 A1* | 11/2018 | Samuel | E21B 49/003 |
| 2019/0114352 A1* | 4/2019 | Sung | G06F 16/26 |
| 2020/0157887 A1* | 5/2020 | Alonso | E21B 43/30 |
| 2021/0026030 A1* | 1/2021 | Dixon | G01V 1/46 |
| 2021/0348493 A1 | 11/2021 | Aziz et al. | |

OTHER PUBLICATIONS

Li et al. (Study on Pressure Measuring and Formation Evaluation Methods While Underbalanced Drilling, Society of Petroleum Engineers, 2011, pp. 1-8) (Year: 2011).*
U.S. Appl. No. 17/647,814, Sierra et al., filed Jan. 12, 2022.
Abaltusov et al., "The use of geosteering to achieve the drilling targets in multilateral fishbone wells in Russkoye Field," Abu Dhabi International Petroleum Exhibition & Conference, Nov. 2019, 14 pages.
Kanfar et al., "Real-time integrated petrophysics: geosteering in challenging geology and fluid systems," SPE Saudi Arabia Section Young Professionals Technical Symposium, Mar. 2012, 10 pages.
PCT International Search Report and Written Opinion in International Appln. No. PCT/US2021/031721, dated Aug. 31, 2021, 16 pages.
PCT International Search Report and Written Opinion in International Appln. No. PCT/US2021/031932, dated Sep. 1, 2021, 15 pages.
Blumbaugh, "Cleveland Formation—Recent Results and Lessons Learned During Horizontal Re-development of a Mature Field," SPE-142790-MS-P, Presented at the SPE Middle East Unconventional Gas Conference and Exhibition, Muscat, Oman, Jan. 31-Feb. 2, 2011; Society of Petroleum Engineers, 2011, 9 pages.
Bybee, "Coiled-Tubing Underbalanced Drilling in the Lisbume Field, Alaska," SPE-0608-0079-JPT, Journal of Petroleum Technology, Jun. 2008, 60(06): 79-82.
Guizada et al., "Application of Underbalanced Coiled Tubing Drilling Technology to Enhance Gas Production in Deep Carbonate Reservoirs," SPE-192786-MS, Presented at the Abu Dhabi International Petroleum Exhibition & Conference, Abu Dhabi, UAE, Nov. 12-15, 2018; Society of Petroleum Engineers, 2018, 8 pages.
Johnson et al., "Coiled-Tubing Underbalanced Drilling Applications in the Lisbume Field, Alaska," IADC/SPE 108337, Presented at the IADC/SPE Managed Pressure Drilling and Underbalanced Operations Conference and Exhibition, Galveston, Texas, Mar. 28-29, 2007; IADC/SPE, 2007, 11 pages.
Kavanagh et al., "Underbalanced Coiled Tubing Drilling Practices in a Deep, Low-Pressure Gas Reservoir," IPTC-10308-MS, Presented at the International Petroleum Technology Conference, Doha, Qatar, Nov. 21-23, 2005; IPTC 2005.
Leising et al., "Underbalanced Drilling With Coiled Tubing and Well Productivity," SPE-28870-MS, Presented at the SPE European Petroleum Conference, London, UK, Oct. 25-27, 1994; Society of Petroleum Engineers, 1994, 16 pages.
Omair et al., "Enhanced Sustained Production from Successful Underbalanced Coiled Tubing Drilling in Saudi Arabian Deep Tight Gas Sandstone and Carbonate Formations," SPE-142363-MS-P, Presented at the SPE Middle East Oil and Gas Show and Conference, Manama, Bahrain, Sep. 25-28, 2011; Society of Petroleum Engineers, 2011, 9 pages.

(56) References Cited

OTHER PUBLICATIONS

Pruitt et al., "Underbalanced Coiled Tubing Drilling Update on a Successful Campaign," SPE-92513-MS, Presented at the SPE/IADC Drilling Conference, Amsterdam, The Netherlands, Feb. 23-25, 2005; SPE/IADC Drilling Conference, 2005, 8 pages.

Silva et al., "A Process Delivery Template for an Underbalanced Coiled Tubing Drilling Project from Concept to Execution," SPE-107244-MS, Presented at the SPE/ICoTA Coiled Tubing and Well Intervention Conference and Exhibition, The Woodlands, Texas, Mar. 20-21, 2007, 10 pages.

* cited by examiner

FIG. 6

```
─────────────── Version 3.3 2019 ───────────────

1st Lateral Drilled Footage       2659'
Max Recorded Gas Rate 1st         3 MMSCFD with 3514 FBHP and 88 FWHP
2nd Lateral Drilled Footage       2597'
Max Recorded Gas Rate 2nd         16 MMSCFD with 3072 FBHP and 325 FWHP
3rd Lateral Drilled Footage       2162'
Max Recorded Gas Rate 3rd         18 MMSCFD with 3203 FBHP and 391 FWHP
Micropal Depth Samples:           15,461'MD - 15,488'MD
Micropal MXD:                     1% - 2%
Micropal Porosity (frac):         0.01 - 0.01
Max Chlorides                     7,000
Total Cum length drilled          7,418

─────────────── Version 3.3 2019 ───────────────
```

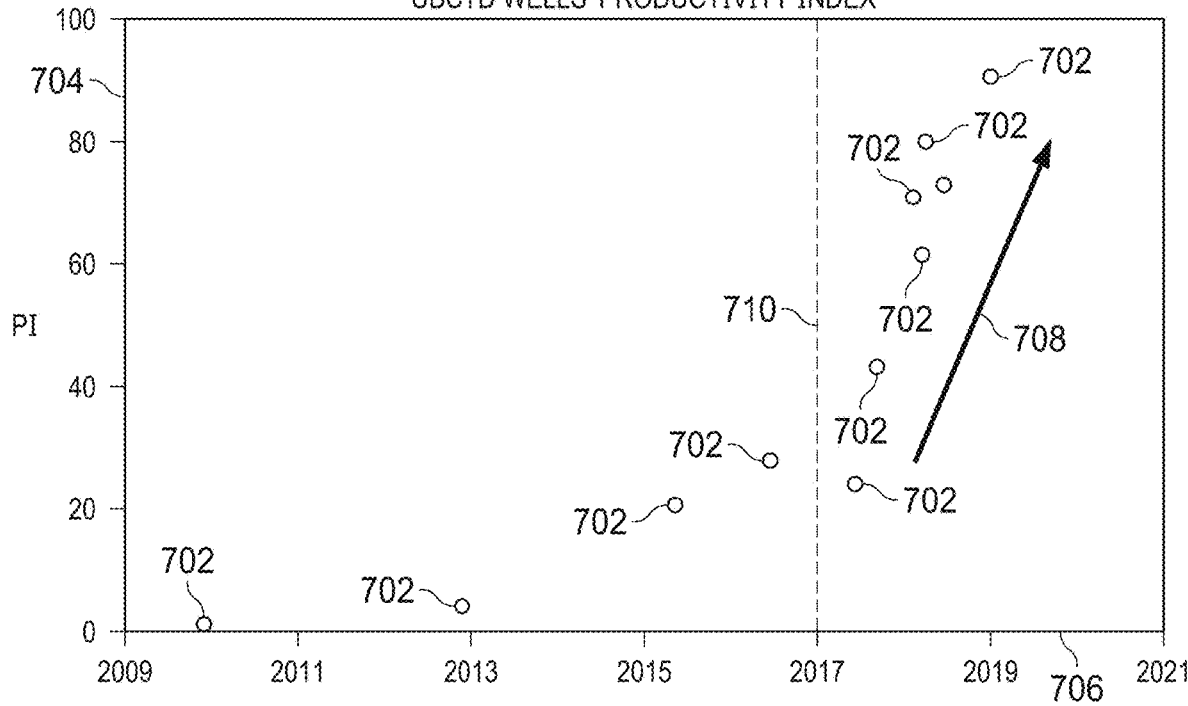

FIG. 7

INTEGRATED ADVANCED VISUALIZATION TOOL FOR GEOSTEERING UNDERBALANCED COILED TUBING DRILLING OPERATIONS

BACKGROUND

The present disclosure applies to techniques using an integrated advanced visualization tool.

Engineers have historically used productivity index (PI) plots as a proxy for drilling across potential good reservoirs. Integrated approaches have been introduced for maximizing net reservoir contact during real-time geo-steering operations. Such approaches can reduce the uncertainty of gas gain as function of drilling parameters changes. However, an engineer can still spend 45 to 60 minutes sorting and preparing data to generate a plot for use in such approaches. Since drilling updates can be reported three times per day, engineers can spend most of the day on data preparation. Moreover, such approaches do not incorporate micro-palynology or lithological description in the analysis. This type of information can be crucial for use in placing laterals in the most-developed layers in order to maximize reservoir contact.

During underbalanced coiled tubing drilling (UBCTD) operations, reservoir engineers can receive large amounts of data from different sources such as drilling parameters, well-testing data, bio-steering data, lithological cutting description, and geological inputs. This type of information can be provided by different disciplines using different formats and structures. The variation of different formats and structures can make decision-making inefficient as engineers are unable to process and analyze all data generated during drilling operations. As a result, engineers may end up relying solely on rate of penetration (ROP) and instantaneous productivity index (PI) information as input to a proxy for drilling across good reservoir quality. Disadvantages of relying solely on an ROP and PI proxy include an increased uncertainty on lateral contribution and gas gain as outputs are not linked with operational changes and geological description.

SUMMARY

The present disclosure describes techniques that can be used for an integrated advanced visualization tool. In some implementations, a computer-implemented method includes the following. Drilling operation data is received from different sources in real time during a drilling operation. The drilling operation data includes geological formation information recorded during the drilling operation, micropalaeontological test results of the drilling operation, drilling parameters being used during the drilling operation, cumulative productivity index calculations, and reservoir pressure information of reservoirs encountered during the drilling operation. The drilling operation data is analyzed to correlate elements of the drilling operation data by time and cumulative depth. A graph is generated in real time that includes multiple plots correlated as a function of cumulative depth over time.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, drilling, testing and geo-steering data can be integrated. Second, underbalanced coiled tubing drilling (UBCTD) monitoring processes, conventionally requiring 2-3 hours per day, can be streamlined to a few minutes. Third, the wellhead productivity index (PI) can be significantly increased (for example, by threefold). Fourth, improved high-quality reservoir contact can lead to effective decision-making. Fifth, improved communication can occur across disciplines for use in improved lateral placement. Sixth, engineers' time needed for collecting daily information can be minimized. Seventh, data analytics can be used to establish intelligent logic among lithology, cutting porosity with gas rates, and productivity index. Eighth, standoff depth can be annotated to avoid potential water encroachment. Ninth, non-reservoir contact across layers can be minimized.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIG. 6 is a screen shot showing example information associated with a lithology description visualization along a lateral, according to some implementations of the present disclosure.

FIG. 7 is a graph showing example productivity index values associated with a UBTCD well after a drilling operation, according to some implementations of the present disclosure.

DETAILED DESCRIPTION

Figure 1:
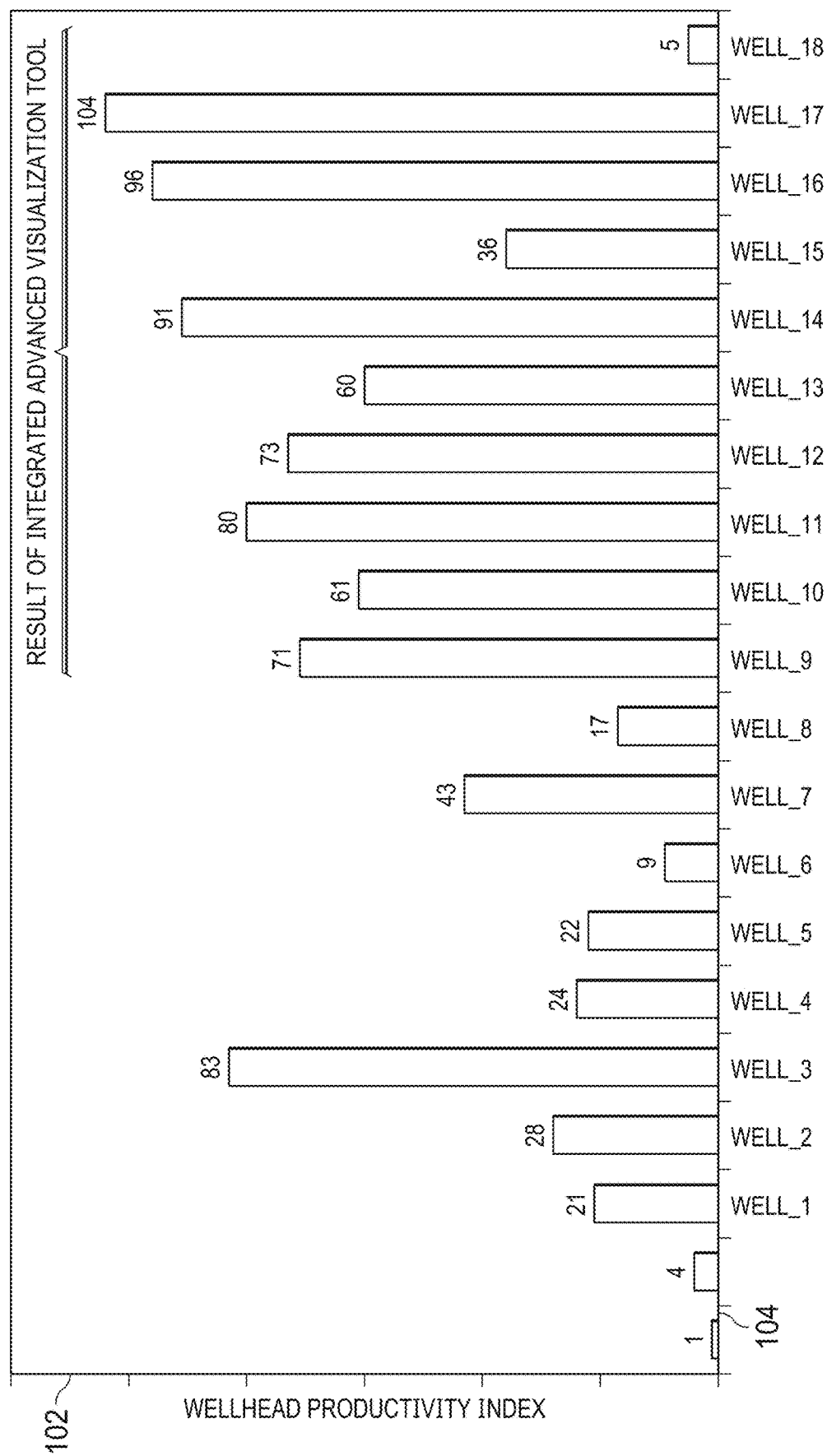
FIG. 1 is a graph showing examples of productivity index improvements achieved through use of an integrated advanced visualization tool, according to some implementations of the present disclosure.

The following detailed description describes techniques for generating a user display showing multiple types of drilling operation information matched to common depths. Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Well testing data can be integrated with drilling parameters changes and geological inputs in order to provide a visualization tool for geo-steering underbalanced coiled tubing drilling operations. These techniques can be used in the oil and gas industry to monitor underbalanced coiled tubing drilling (UBCTD) gas wells, for example. The techniques can be validated with well testing and comparison with previous wells that used conventional UBCTD monitoring approached. Validation can use the productivity index (PI) and the rate of penetration (ROP) as a proxy for reservoir contact, for example.

A platform can be sized to handle "big data" in an integrated manner using advanced visualization tools to empower an engineer to make informed and efficient geo-steering decisions in complex UBCTD laterals. Applications that are used can integrate geological data with engineering data to monitor UBTCD operations. The applications can streamline data integration between different sources and structures, such as to provide drilling, well testing, geological, and palynological data in a single plot. The applications and techniques can be implemented, for example, in a U-STEER product produced by Saudi Aramco. In some cases, use of such a product can reduce data preparation time from 60 minutes to less than 2 minutes. Moreover, the product can capitalize on the use of real-time data. As an example, the term real-time can correspond to events, including data updates, that occur within a specified period of time, such as within a few minutes or a few seconds.

In some implementations, applications can be developed and written in the Python language or some other language that can be used to streamline and optimize decision-making processes for UBCTD operations. For example, optimizing drilling operations can refer to achieving PI values that indicate or result in a performance greater than a predefined threshold, including being able to complete drilling operations faster. In the oil and gas industry, for example, a fully-integrated platform can be used for tracking UBCTD operations. The fully-integrated platform can be developed and tested in gas wells drilled using UBCTD technology. These and other implementations can produce a threefold increase in a well productivity index compared with wells monitored with conventional UBCTD methodologies and practices.

Due to the limited logging while drilling (LWD) measurements and lack of data integration in conventional techniques, monitoring underbalance coiled tubing drilling can typically be time-consuming and often ineffective. Significant time can be needed for engineers to perform data gathering. Also, conventional techniques do not incorporate the integration of bio-steering data with drilling engineering and well-testing data. Data analytics and intelligent logic can be adopted to help engineers maximize reservoir contact and improve well deliverability. These results can be realized, for example, in carbonate and sandstones reservoirs. Commercial applications for the techniques described in the present disclosure can include daily operations for monitoring and geo-steering UBCTD gas wells.

FIG. 1 is a graph 100 showing examples of productivity index improvements achieved through use of an integrated advanced visualization tool, according to some implementations of the present disclosure. The graph 100 shows a wellhead productivity index 102 for different wells 104. Productivity index improvements are shown in FIG. 1 as being achieved by Well_9 through Well_18 of the different wells 104, for example.

Figure 2:
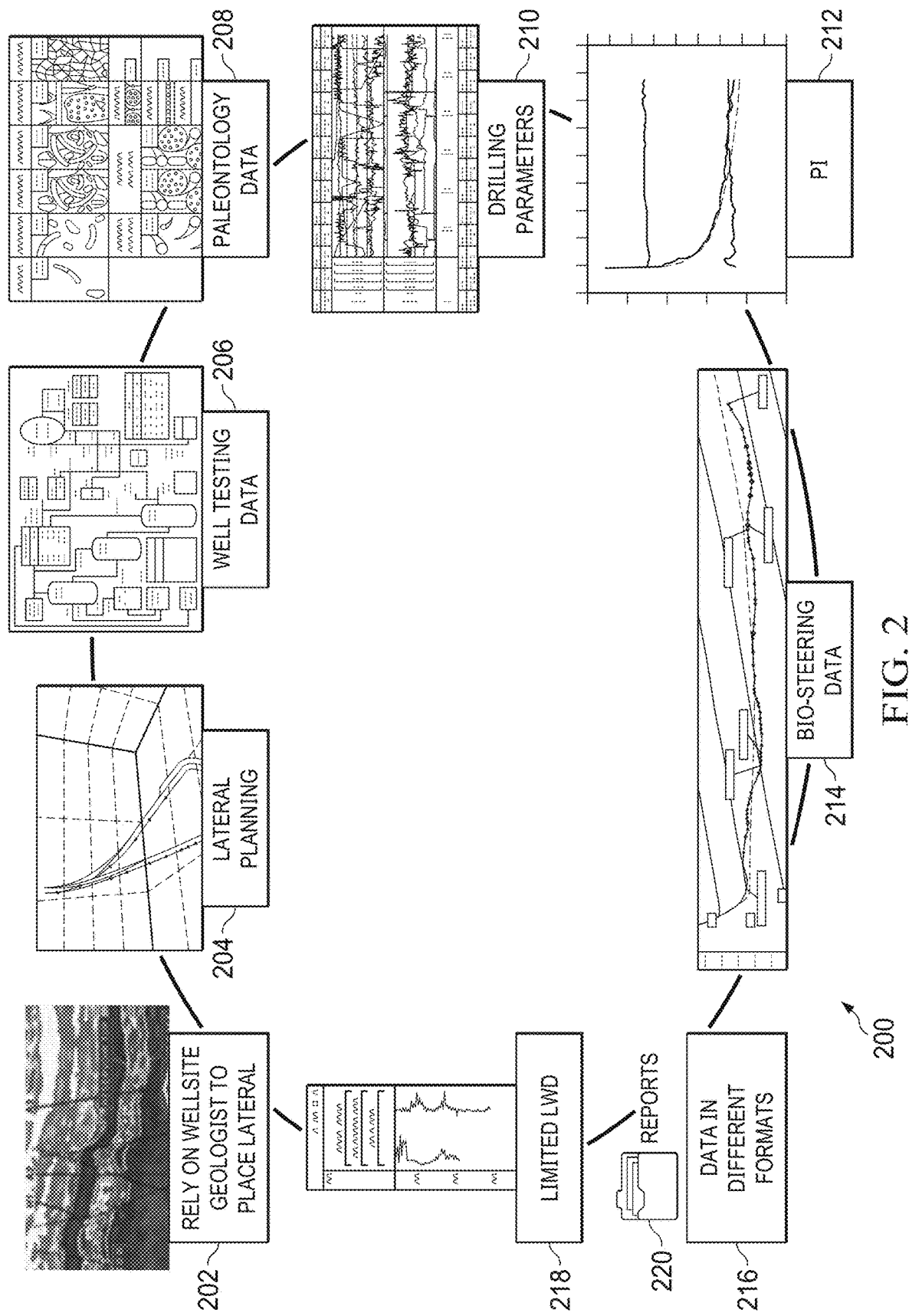
FIG. 2 is a block diagram showing examples of multiple data sources used in a workflow for underbalanced coiled tubing drilling (UBCTD) operations, according to some implementations of the present disclosure.

FIG. 2 is a block diagram showing examples of multiple data sources used in a workflow 200 for underbalanced coiled tubing drilling (UBCTD) operations, according to some implementations of the present disclosure. The multiple data sources can include different sources providing data in different formats, for example. The multiple data sources can include information 202 from wellsite geologists placing laterals, lateral planning data 204, well testing data 206, paleontology data 208, drilling parameters 210, productivity index data 212, bio-steering data 214, data in different formats 216, and limited LWD data 218. Reports 220 can be generated from the multiple data sources and in different formats, for example, spreadsheets, Portable Document Format (PDF) files, email messages, and web updates.

The workflow 200 and techniques described in the present disclosure can use greedy algorithms (for example, using panda and glob modules) to handle (and merge, as needed) big data. Merged information can be processed by mathematic algorithms to generate a single montage that can help engineer to assess well performance while drilling.

Figure 3:
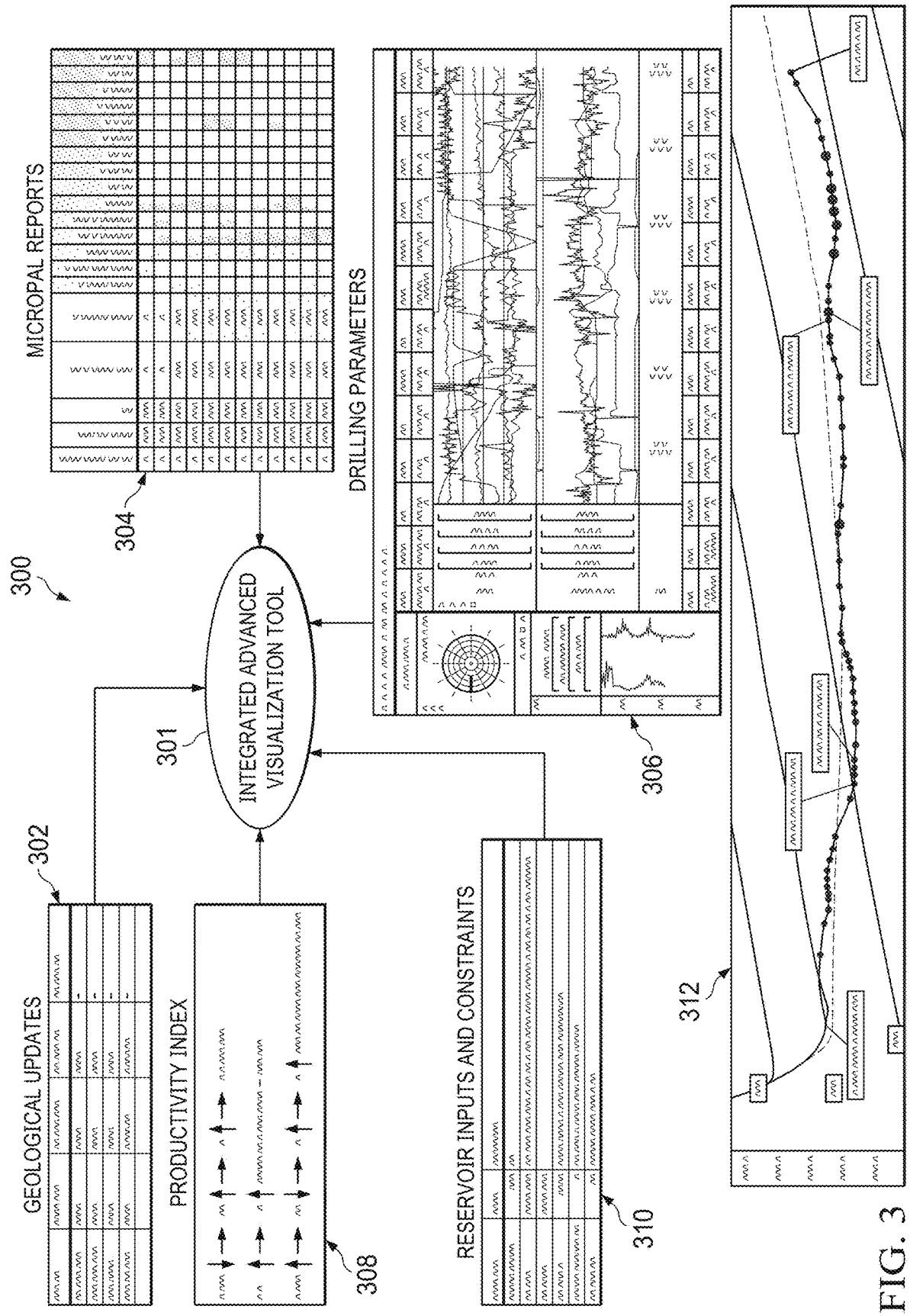
FIG. 3 is a block diagram showing examples of inputs used in a system for UBCTD operations, according to some implementations of the present disclosure.

FIG. 3 is a block diagram showing examples of inputs used in a system 300 for UBCTD operations, according to some implementations of the present disclosure. The inputs of the system 300 can represent a workflow using different data sources is inputs into application software included in an integrated advanced visualization tool 301, for example. The inputs can be grouped, for example, into five categories.

Geological updates 302 can include information associated with geological features such us formation tops and formation dipping. Palynological test results (or micropal reports 304) can include lithological description and palynological results from cuttings. Drilling parameters 306 can include parameters such as rate of penetration, gas rate, pressure, and nitrogen injection. Inputs to the integrated advanced visualization tool 301 also include cumulative productivity index 308 calculations and reservoir inputs and constraints 310 (including pressure information).

The integrated advanced visualization tool 301 can generate plots 312 that can be presented to a user in a graphical user interface (GUI). Generating the plots 312 can result while assessing well performance while drilling UBCTD wells. In some implementations, the main outputs, or tracks, included in the plots 312 can be generated in less than a minute. For example, drilling parameters, well testing data, and micropal results can be visualized in a single plot as shown in FIG. 3. In some implementations, the plots 312 can include, for example, five tracks plotted as a function of cumulative depth as follows.

Track 1 can plot the instantaneous gas rate while drilling, cumulative PI, and lateral limits. Track 2 can plot pressures such as bottom-hole pressure, wellhead pressure, and differential pressure between expected reservoir pressure and bottom-hole pressure. Track 3 can plot a rate of penetration and a nitrogen pumping rate. Track 4 can plot choke size opening and formation tops associated with field geology descriptions. Track 5 can plot micropal output. Data analytics can be used to determine that microcrystalline (MXD) porosity with visual porosity are good proxies for high potential reservoir contact. An MXD is plotted with respect to MD well trajectory while porosity is plotted with respect to the TVD trajectory of the lateral.

Figure 4A:
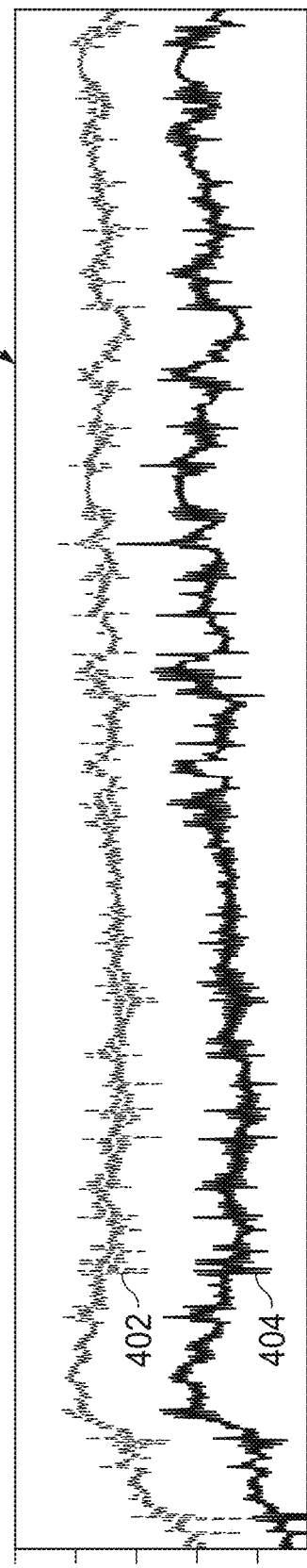
FIGS. 4A-4E are graphs showing examples of plots associated with a drilling process over time, according to some implementations of the present disclosure.
Figure 4B:
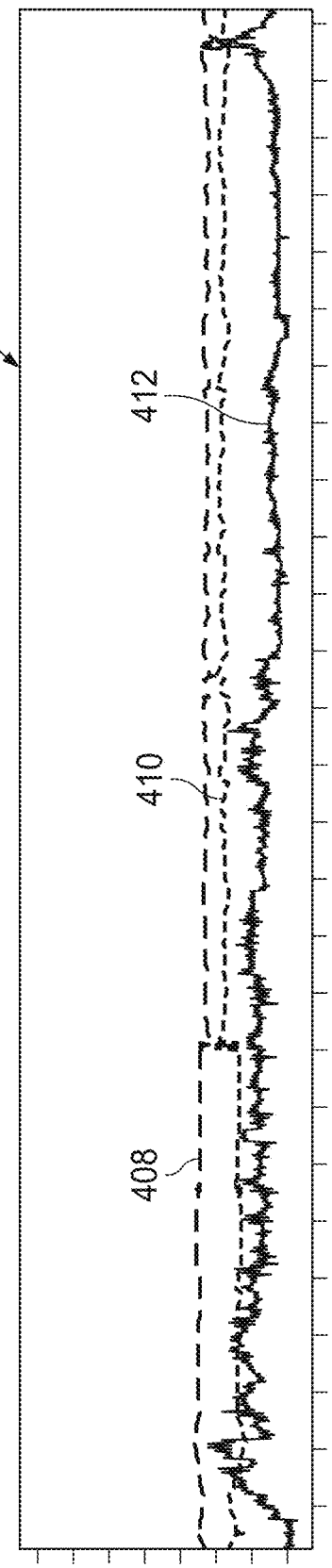
Figure 4C:
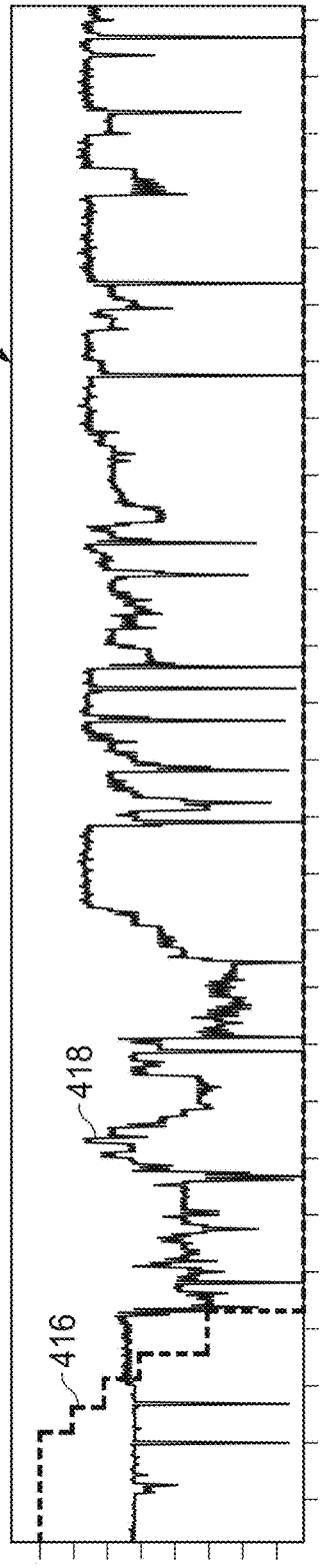
Figure 4D:
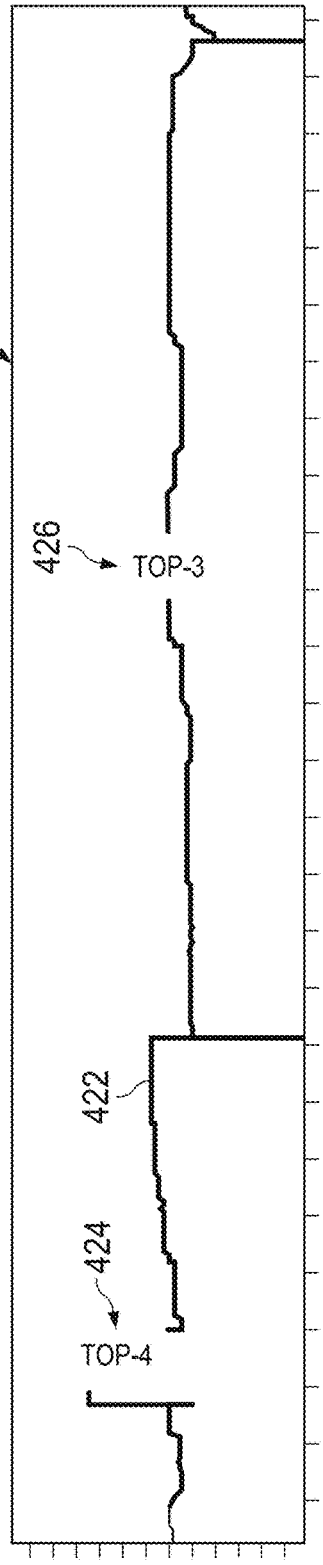
Figure 4E:
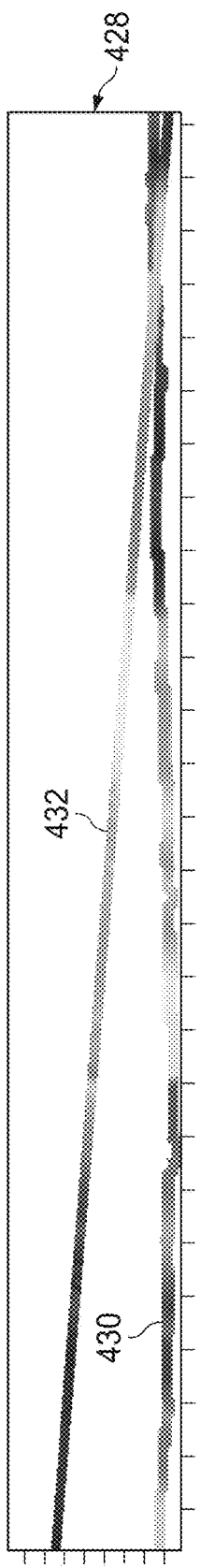

FIGS. 4A-4E are graphs showing examples of plots associated with a drilling process over time, according to some implementations of the present disclosure. FIG. 4A is a graph 400 showing PI 402 and total production rate ($Q_g$) 404, for example, in million standard cubic feet per day (MMSCFD). FIG. 4B is a graph 406 showing pressure measurements, including bottom hole pressure (BHP) 408, for example, in pounds per square inch (psi), Delta P. 410 differential pressure between Reservoir pressure and BHP. for example, in pounds per square inch (psi), and wellhead platform (WHP) 412, for example, in psi. FIG. 4C is a graph 414 showing N2 416 standard cubic feet (SCF) and rate of penetration (ROP) 418, for example, in feet/minute. FIG. 4D is a graph 420 showing choke 422 over time, identifying tops 424 and 426. FIG. 4E is a graph 428 showing a True Vertical Depth (TVD) 430 colored by porosity results by lithology description (TVD in feet; porosity units are percentages), and Measured Depth (MD) 432 colored by Microcrystalline (MXD) description by micropal reports (MD in feet), with MXD units in fractions. Magnitudes are indicated by magnitude bar 411.

Figure 5A:
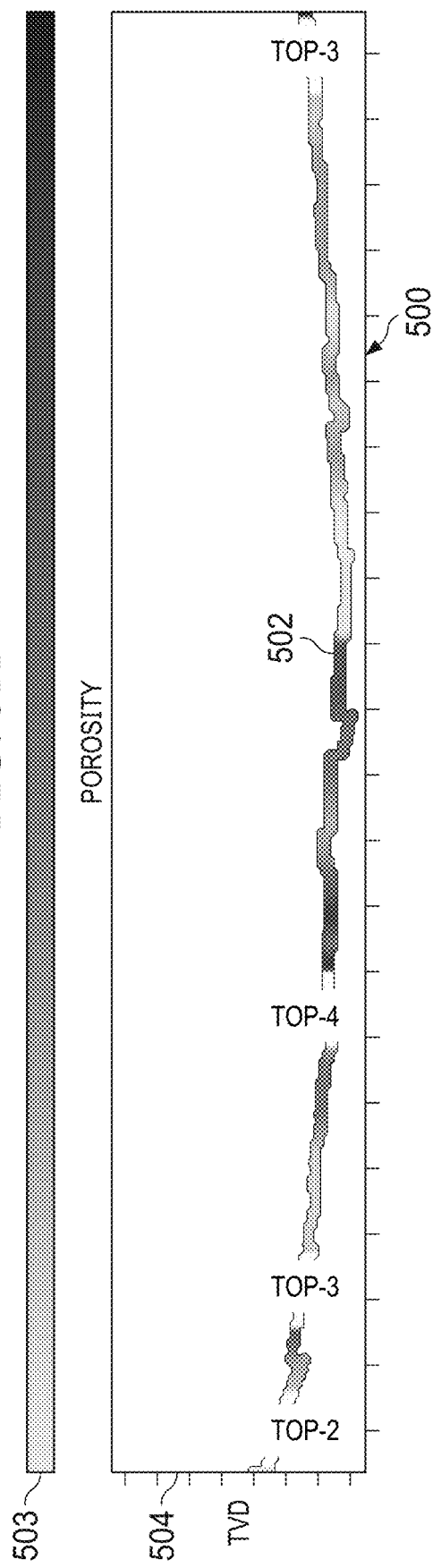
FIGS. 5A-5D are graphs showing examples of plots associated with a lithology description visualization along a lateral, according to some implementations of the present disclosure.
Figure 5B:
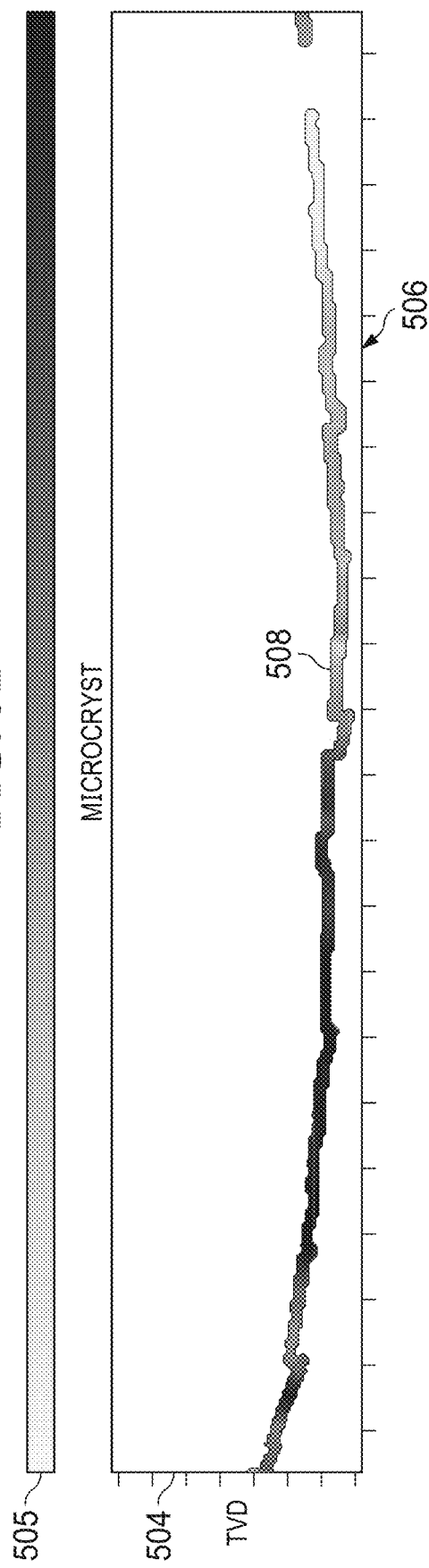
Figure 5C:
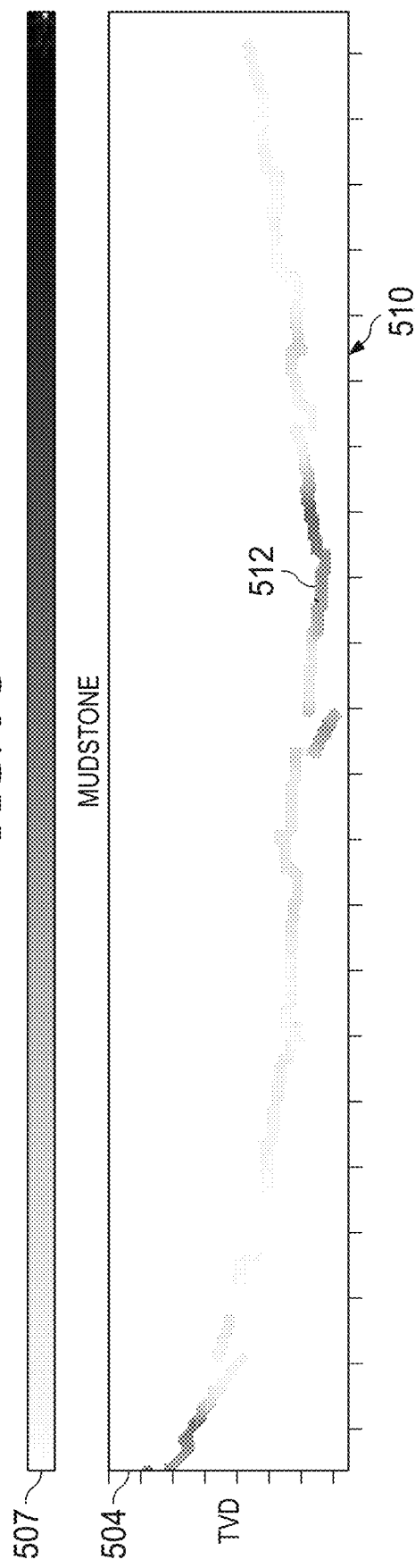
Figure 5D:
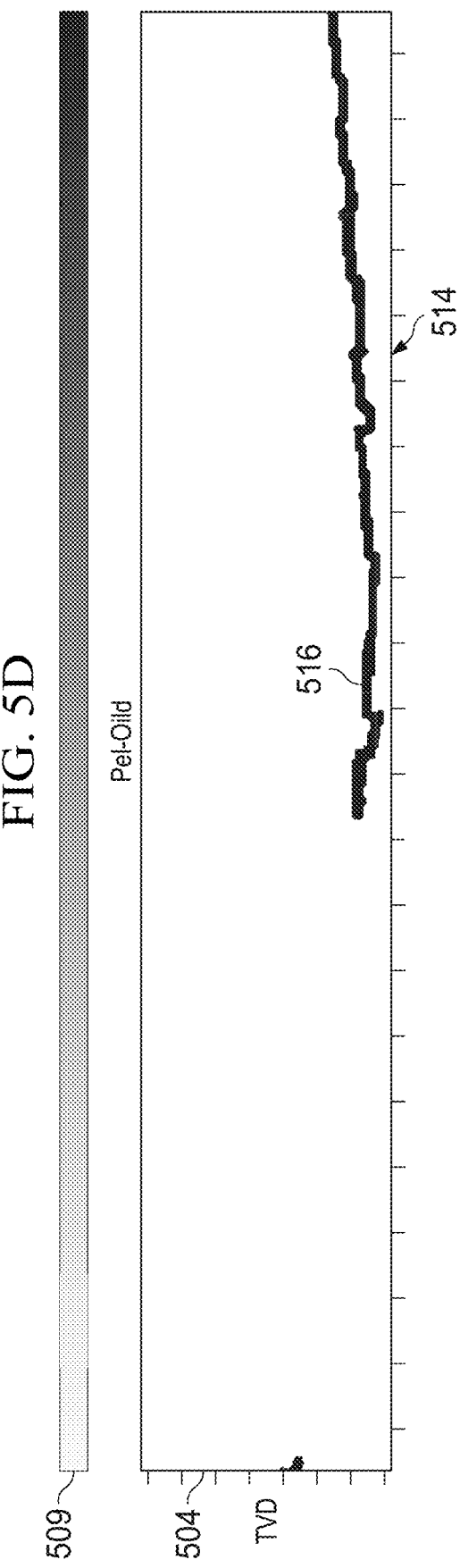

FIGS. 5A-5D are graphs showing examples of plots associated with a lithology description visualization along a lateral, according to some implementations of the present disclosure. FIG. 5A is a graph 500 showing porosity 502 relative to TVD 504. FIG. 5B is a graph 506 showing microcrystalline 508 relative to TVD 504. FIG. 5C is a graph 510 showing mudstone 512 relative to TVD 504. This graph represents a brief journal of the lithology encountered along all laterals. FIG. 5D is a graph 514 showing pel-oil 516 relative to TVD 504. By analyzing these plots, an engineer can make informed decision on the way forward during geo-steering in the well laterals. Microcrystalline (MXD), mudstone, and pel-oil are terms that can be included in the lithological description from cutting analysis conducted by a Micropaleontology team. In this case, the terms are related to a carbonate description. Terms applicable to sandstones and sandstone lithology can include quartz, clay, and illite, for example. Magnitudes in the graphs of FIGS. 5A-5D are indicated by magnitude bars 501, 503, 505, 507, and 509. Properties are represented as percentages. Porosities are represented as fractions.

FIG. 6 is a screen shot showing example information 600 associated with a lithology description visualization along a lateral, according to some implementations of the present disclosure. The information 600 can include depth information, gas rates, porosities, and other information generated in real time during a drilling operation. Specifically, FIG. 6 shows an overall summary of the current drilling operation.

FIG. 7 is a graph showing example productivity index 700 values associated with a UBTCD well after a drilling operation, according to some implementations of the present disclosure. The productivity index 700 values include PI values 702 plotted relative to a PI axis 704 and time 706 (years). As shown in FIG. 7, a significant increase (for example, more than 200%) in wellhead PI values is seen starting in 2017 after implementation of the integrated advanced visualization tool. This represents a threefold increase on well productivity index compared with wells monitored with conventional UBCTD methodologies. This result can occur because the integrated advanced visualization tool can optimize decision-making and communication in order to improve (708) well productivity after a time 710 when the integrated advanced visualization tool was implemented. Moreover, use of the integrated advanced visualization tool can streamline and integrate increased amounts of geological and engineering data, including testing, biosteering, and drilling parameters used in the oil and gas industry.

Figure 8:
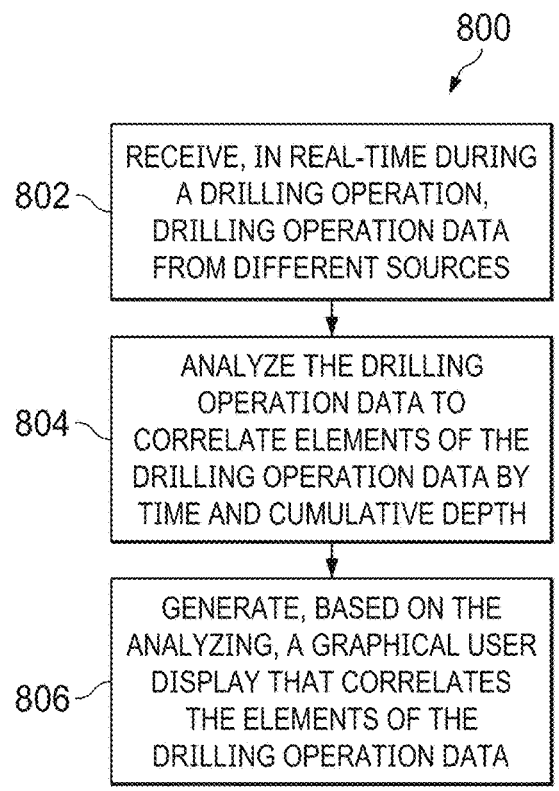
FIG. 8 is a flowchart of an example of a method for presenting a user display showing multiple types of drilling operation information matched to common depths, according to some implementations of the present disclosure

FIG. 8 is a flowchart of an example of a method 800 for presenting a user display showing multiple types of drilling operation information matched to common depths, according to some implementations of the present disclosure. The user display that is presented can include, for example, the graphs and plots described with reference to FIGS. 4A-4E and FIGS. 5A-5D. For clarity of presentation, the description that follows generally describes method 800 in the context of the other figures in this description. However, it will be understood that method 800 can be performed, for example, by any suitable system, environment, software, and hardware, or a combination of systems, environments, software, and hardware, as appropriate. In some implementations, various steps of method 800 can be run in parallel, in combination, in loops, or in any order.

At 802, drilling operation data is received from different sources in real-time during a drilling operation. The drilling operation data can include, for example, geological formation information recorded during the drilling operation, micropalaeontological test results of the drilling operation, drilling parameters being used during the drilling operation, cumulative productivity index calculations, and reservoir pressure information of reservoirs encountered during the drilling operation. The information can be collected from local information sources, including pressure gauges and other equipment used during drilling. The geological formation information can include formation tops and formation dipping. The micropalaeontological test results can include a lithological description of micropalaeontological results from cuttings, including rock origin and mineral composition and classification. The drilling parameters can include a rate of penetration, a gas rate, pressure readings, and a nitrogen injection rate. From 802, method 800 proceeds to 804.

At 804, the drilling operation data is analyzed to correlate elements of the drilling operation data by time and cumulative depth. For example, even though the drilling information may have different formats and can be mapped to different scales, the information can be interpolated so that similar depths can be matched. From 804, method 800 proceeds to 806.

At 806, a graphical user display is generated based on the analyzing that correlates the elements of the drilling operation data. As an example, the graphical user display can include multiple plots correlated as a function of cumulative depth over time. The multiple plots include individual tracks including: a first track plotting an instantaneous gas rate while drilling, a cumulative PI, and lateral limits; a second track plotting pressures including a bottom-hole pressure, a wellhead pressure, and a differential pressure between an expected reservoir pressure and the bottom-hole pressure; a third track plotting a rate of penetration and a nitrogen pumping rate; a fourth track plotting a choke size opening and formation tops associated with field geology descriptions; and a fifth track plotting micropal output. After 806, method 800 can stop.

In some implementations, method 800 further includes updating algorithms using historical information. For example, data mining can be performed on historical information from previous drilling operations. The historical information can be analyzing based on the data mining. Algorithms for determining lateral placement and increasing reservoir contact can be updating based on the analyzing. The updates can be updates that are suggested by application software and selected, by a user, to be included into the algorithms. The historical information that is use can focus on mining operations that have similar geologies or other features that can be modeled in an algorithm.

In some implementations, data mining can be used on historical information from previous drilling operations. The information that is mined can include similar inputs as described in this disclosure and used in generating plots used by engineers for geo-steering during underbalanced coiled tubing drilling operations. Analysis of the mined data can be used in real-time to improve algorithms for determining lateral placement and increasing reservoir contact. As an example, the term real-time can correspond to events, including data updates, that occur within a specified period of time, such as within a few minutes or a few seconds.

In some implementations, method 800 further includes providing a three-dimensional (3D) visualization based on an advanced artificial intelligence (AI) algorithm used to predict high-productive layers ahead of a bit during a drilling operation. As an example, the graphical user display presented to the user can include a 3D representation of locations ahead of the drill bit that are annotated with information related to different magnitudes of expected productivities.

Figure 9:
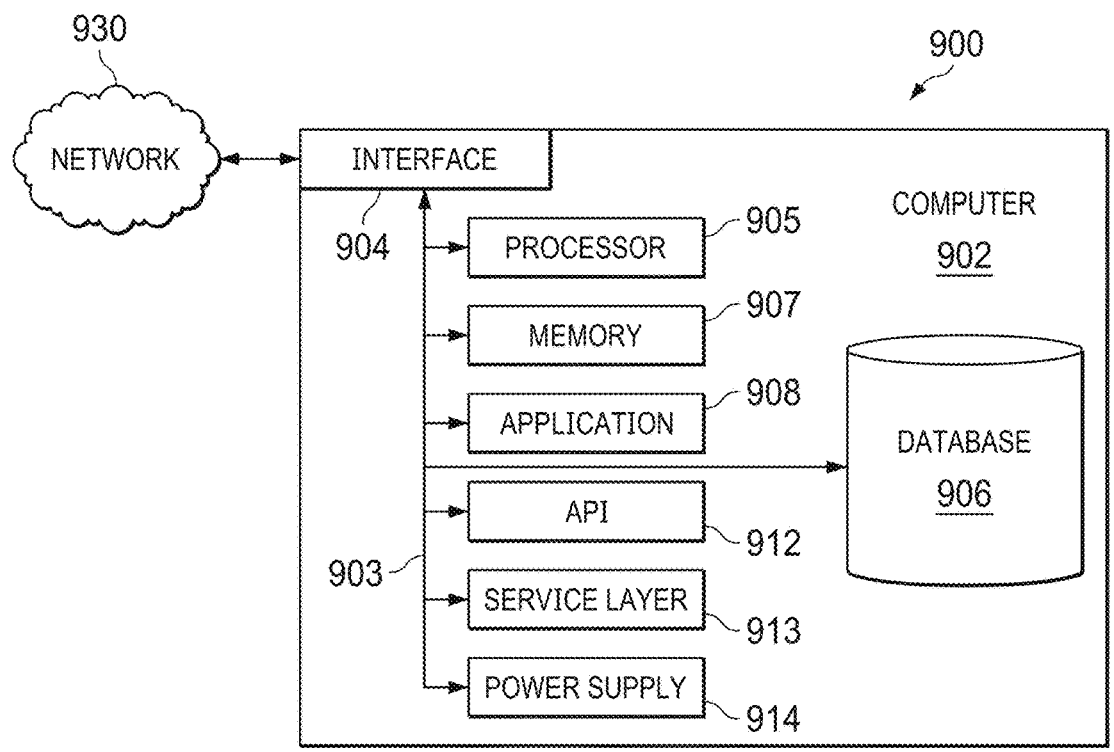
FIG. 9 is a block diagram illustrating an example computer system used to provide computational functionalities associated with described algorithms, methods, functions, processes, flows, and procedures as described in the present disclosure, according to some implementations of the present disclosure.

FIG. 9 is a block diagram of an example computer system 900 used to provide computational functionalities associated with described algorithms, methods, functions, processes, flows, and procedures described in the present disclosure, according to some implementations of the present disclosure. The illustrated computer 902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI).

The computer 902 can serve in a role as a client, a network component, a server, a database, a persistency, or components of a computer system for performing the subject matter described in the present disclosure. The illustrated computer 902 is communicably coupled with a network 930. In some implementations, one or more components of the computer 902 can be configured to operate within different environments, including cloud-computing-based environments, local environments, global environments, and combinations of environments.

At a top level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 903. In some implementations, any or all of the components of the computer 902, including hardware or software components, can interface with each other or the interface 904 (or a combination of both) over the system bus 903. Interfaces can use an application programming interface (API) 912, a service layer 913, or a combination of the API 912 and service layer 913. The API 912 can include specifications for routines, data structures, and object classes. The API 912 can be either computer-language independent or dependent. The API 912 can refer to a complete interface, a single function, or a set of APIs.

The service layer 913 can provide software services to the computer 902 and other components (whether illustrated or not) that are communicably coupled to the computer 902. The functionality of the computer 902 can be accessible for all service consumers using this service layer. Software services, such as those provided by the service layer 913, can provide reusable, defined functionalities through a defined interface. For example, the interface can be software written in JAVA, C++, or a language providing data in extensible markup language (XML) format. While illustrated as an integrated component of the computer 902, in alternative implementations, the API 912 or the service layer 913 can be stand-alone components in relation to other components of the computer 902 and other components communicably coupled to the computer 902. Moreover, any or all parts of the API 912 or the service layer 913 can be implemented as child or sub-modules of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 also includes a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

The application 908 can be an algorithmic software engine providing functionality according to particular needs, desires, or particular implementations of the computer 902 and the described functionality. For example, application 908 can serve as one or more components, modules, or applications. Further, although illustrated as a single application 908, the application 908 can be implemented as multiple applications 908 on the computer 902. In addition, although illustrated as internal to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system containing computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Described implementations of the subject matter can include one or more features, alone or in combination.

For example, in a first implementation, a computer-implemented method includes the following. Drilling operation data is received from different sources in real time during a drilling operation. The drilling operation data includes geological formation information recorded during the drilling operation, micropalaeontological test results of the drilling operation, drilling parameters being used during the drilling operation, cumulative productivity index calculations, and reservoir pressure information of reservoirs encountered during the drilling operation. The drilling operation data is analyzed to correlate elements of the drilling operation data by time and cumulative depth. A graph is generated in real time that includes multiple plots correlated as a function of cumulative depth over time.

The foregoing and other described implementations can each, optionally, include one or more of the following features:

A first feature, combinable with any of the following features, where the graphical user display includes multiple plots correlated as a function of cumulative depth over time.

A second feature, combinable with any of the previous or following features, where the multiple plots include individual tracks including: a first track plotting an instantaneous gas rate while drilling, a cumulative PI, and lateral limits; a second track plotting pressures including a bottom-hole pressure, a wellhead pressure, and a differential pressure between an expected reservoir pressure and the bottom-hole pressure; a third track plotting a rate of penetration and a nitrogen pumping rate; a fourth track plotting a choke size opening and formation tops associated with field geology descriptions; and a fifth track plotting micropal output.

A third feature, combinable with any of the previous or following features, where the geological formation information includes formation tops, formation dipping.

A fourth feature, combinable with any of the previous or following features, where the micropalaeontological test results include a lithological description of micropalaeontological results from cuttings, including rock origin and mineral composition and classification.

A fifth feature, combinable with any of the previous or following features, where the drilling parameters include a rate of penetration, a gas rate, pressure readings, and a nitrogen injection rate.

A sixth feature, combinable with any of the previous or following features, the method further including: performing data mining on historical information from previous drilling operations; analyzing, based on the data mining, the historical information; and updating, based on the analyzing, algorithms for determining lateral placement and increasing reservoir contact.

A seventh feature, combinable with any of the previous or following features, the method further including providing a three-dimensional (3D) visualization based on an advanced artificial intelligence (AI) algorithm used to predict high-productive layers ahead of a bit during a drilling operation.

In a second implementation, a non-transitory, computer-readable medium stores one or more instructions executable by a computer system to perform operations including the following. Drilling operation data is received from different sources in real time during a drilling operation. The drilling operation data includes geological formation information recorded during the drilling operation, micropalaeontological test results of the drilling operation, drilling parameters being used during the drilling operation, cumulative productivity index calculations, and reservoir pressure information of reservoirs encountered during the drilling operation. The drilling operation data is analyzed to correlate elements of the drilling operation data by time and cumulative depth. A graph is generated in real time that includes multiple plots correlated as a function of cumulative depth over time.

The foregoing and other described implementations can each, optionally, include one or more of the following features:

A first feature, combinable with any of the following features, where the graphical user display includes multiple plots correlated as a function of cumulative depth over time.

A second feature, combinable with any of the previous or following features, where the multiple plots include individual tracks including: a first track plotting an instantaneous gas rate while drilling, a cumulative PI, and lateral limits; a second track plotting pressures including a bottomhole pressure, a wellhead pressure, and a differential pressure between an expected reservoir pressure and the bottomhole pressure; a third track plotting a rate of penetration and a nitrogen pumping rate; a fourth track plotting a choke size opening and formation tops associated with field geology descriptions; and a fifth track plotting micropal output.

A third feature, combinable with any of the previous or following features, where the geological formation information includes formation tops, formation dipping.

A fourth feature, combinable with any of the previous or following features, where the micropalaeontological test results include a lithological description of micropalaeontological results from cuttings, including rock origin and mineral composition and classification.

A fifth feature, combinable with any of the previous or following features, where the drilling parameters include a rate of penetration, a gas rate, pressure readings, and a nitrogen injection rate.

A sixth feature, combinable with any of the previous or following features, the operations further including: performing data mining on historical information from previous drilling operations; analyzing, based on the data mining, the historical information; and updating, based on the analyzing, algorithms for determining lateral placement and increasing reservoir contact.

A seventh feature, combinable with any of the previous or following features, the operations further including providing a three-dimensional (3D) visualization based on an advanced artificial intelligence (AI) algorithm used to predict high-productive layers ahead of a bit during a drilling operation.

In a third implementation, a computer-implemented system includes one or more processors and application code executed by the one or more processors. The execution includes analyzing real-time information received from different data sources associated with a drilling operation. The real-time information includes wellsite geologist inputs, lateral planning data, well-testing data, paleontological data, drilling parameters, productivity index information, biosteering data, and limited logging while drilling (LWD) measurements. Instructions for presenting graphical information are provided for presentation to a user based on the analyzing. The computer-implemented system includes a non-transitory computer-readable storage medium coupled to the one or more processors and storing programming instructions for execution by the one or more processors. The programming instructions instruct the one or more processors to perform operations including the following. Drilling operation data is received from different sources in real time during a drilling operation. The drilling operation data includes geological formation information recorded during the drilling operation, micropalaeontological test results of the drilling operation, drilling parameters being used during the drilling operation, cumulative productivity index calculations, and reservoir pressure information of reservoirs encountered during the drilling operation. The drilling operation data is analyzed to correlate elements of the drilling operation data by time and cumulative depth. A graph is generated in real time that includes multiple plots correlated as a function of cumulative depth over time.

The foregoing and other described implementations can each, optionally, include one or more of the following features:

A first feature, combinable with any of the following features, where the graphical user display includes multiple plots correlated as a function of cumulative depth over time.

A second feature, combinable with any of the previous or following features, where the multiple plots include individual tracks including: a first track plotting an instantaneous gas rate while drilling, a cumulative PI, and lateral limits; a second track plotting pressures including a bottomhole pressure, a wellhead pressure, and a differential pressure between an expected reservoir pressure and the bottomhole pressure; a third track plotting a rate of penetration and a nitrogen pumping rate; a fourth track plotting a choke size opening and formation tops associated with field geology descriptions; and a fifth track plotting micropal output.

A third feature, combinable with any of the previous or following features, where the geological formation information includes formation tops, formation dipping.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
   receiving, in real-time during a drilling operation, drilling operation data, wherein:
      the drilling operation data is relative to at least one of time or cumulative depth;
      the drilling operation data has different sources, including:
         geological formation information recorded during the drilling operation,
         micropalaeontological test results of the drilling operation,
         drilling parameters being used during the drilling operation,
         cumulative productivity index calculations, and
         reservoir pressure information of reservoirs encountered during the drilling operation and,
      the drilling operation data sources include similar or dissimilar format and structure;
   analyzing the drilling operation data to correlate elements of the drilling operation data to at least one of time or cumulative depth; and
   generating, based on the analyzing, a graphical user display that correlates the elements of the drilling operation data to at least one of time or cumulative depth.

2. The computer-implemented method of claim 1, wherein the graphical user display includes multiple plots correlated as a function of cumulative depth over time.

3. The computer-implemented method of claim 2, wherein the multiple plots include individual tracks comprising:

a first track plotting an instantaneous gas rate while drilling, a cumulative PI, and lateral limits;
a second track plotting pressures including a bottom-hole pressure, a wellhead pressure, and a differential pressure between an expected reservoir pressure and the bottom-hole pressure;
a third track plotting a rate of penetration and a nitrogen pumping rate;
a fourth track plotting a choke size opening and formation tops associated with field geology descriptions; and
a fifth track plotting micropal output.

4. The computer-implemented method of claim 1, wherein the geological formation information includes formation tops, formation dipping.

5. The computer-implemented method of claim 1, wherein the micropalaeontological test results include a lithological description of micropalaeontological results from cuttings, including rock origin and mineral composition and classification.

6. The computer-implemented method of claim 1, wherein the drilling parameters include a rate of penetration, a gas rate, pressure readings, and a nitrogen injection rate.

7. The computer-implemented method of claim 1, further comprising:
performing data mining on historical information from previous drilling operations;
analyzing, based on the data mining, the historical information; and
updating, based on the analyzing, algorithms for determining lateral placement and increasing reservoir contact.

8. The computer-implemented method of claim 1, further comprising providing a three-dimensional (3D) visualization based on an advanced artificial intelligence (AI) algorithm used to predict high-productive layers ahead of a bit during a drilling operation.

9. A non-transitory, computer-readable medium storing one or more instructions executable by a computer system to perform operations comprising:
receiving, in real-time during a drilling operation, drilling operation data, wherein:
the drilling operation data is relative to at least one of time or cumulative depth;
the drilling operation data has different sources, including:
geological formation information recorded during the drilling operation,
micropalaeontological test results of the drilling operation,
drilling parameters being used during the drilling operation,
cumulative productivity index calculations, and
reservoir pressure information of reservoirs encountered during the drilling operation and,
the drilling operation data sources include similar or dissimilar format and structure;
analyzing the drilling operation data to correlate elements of the drilling operation data to at least one of time or cumulative depth; and
generating, based on the analyzing, a graphical user display that correlates the elements of the drilling operation data to at least one of time or cumulative depth.

10. The non-transitory, computer-readable medium of claim 9, wherein the graphical user display includes multiple plots correlated as a function of cumulative depth over time.

11. The non-transitory, computer-readable medium of claim 10, wherein the multiple plots include individual tracks comprising:
a first track plotting an instantaneous gas rate while drilling, a cumulative PI, and lateral limits;
a second track plotting pressures including a bottom-hole pressure, a wellhead pressure, and a differential pressure between an expected reservoir pressure and the bottom-hole pressure;
a third track plotting a rate of penetration and a nitrogen pumping rate;
a fourth track plotting a choke size opening and formation tops associated with field geology descriptions; and
a fifth track plotting micropal output.

12. The non-transitory, computer-readable medium of claim 9, wherein the geological formation information includes formation tops, formation dipping.

13. The non-transitory, computer-readable medium of claim 9, wherein the micropalaeontological test results include a lithological description of micropalaeontological results from cuttings, including rock origin and mineral composition and classification.

14. The non-transitory, computer-readable medium of claim 9, wherein the drilling parameters include a rate of penetration, a gas rate, pressure readings, and a nitrogen injection rate.

15. The non-transitory, computer-readable medium of claim 9, the operations further comprising:
performing data mining on historical information from previous drilling operations;
analyzing, based on the data mining, the historical information; and
updating, based on the analyzing, algorithms for determining lateral placement and increasing reservoir contact.

16. The non-transitory, computer-readable medium of claim 9, the operations further comprising providing a three-dimensional (3D) visualization based on an advanced artificial intelligence (AI) algorithm used to predict high-productive layers ahead of a bit during a drilling operation.

17. A computer-implemented system, comprising:
one or more processors;
application code executed by the one or more processors, the execution comprising:
analyzing real-time information received from different data sources associated with a drilling operation, the real-time information including wellsite geologist inputs, lateral planning data, well-testing data, paleontological data, drilling parameters, productivity index information, bio-steering data, and limited logging while drilling (LWD) measurements; and
providing, for presentation to a user, instructions for presenting graphical information based on the analyzing; and
a non-transitory computer-readable storage medium coupled to the one or more processors and storing programming instructions for execution by the one or more processors, the programming instructions instructing the one or more processors to perform operations comprising:
receiving, in real-time during a drilling operation, drilling operation data, wherein:
the drilling operation data is relative to at least one of time or cumulative depth;
the drilling operation data has different sources, including:

geological formation information recorded during the drilling operation, micropalaeontological test results of the drilling operation, drilling parameters being used during the drilling operation, cumulative productivity index calculations, and reservoir pressure information of reservoirs encountered during the drilling operation; and, the drilling operation data sources include similar or dissimilar format and structure;

analyzing the drilling operation data to correlate elements of the drilling operation data to at least one of time or cumulative depth; and generating, based on the analyzing, a graphical user display that correlates the elements of the drilling operation data to at least one of time or cumulative depth.

18. The computer-implemented system of claim 17, wherein the graphical user display includes multiple plots correlated as a function of cumulative depth over time.

19. The computer-implemented system of claim 18, wherein the multiple plots include individual tracks comprising:

a first track plotting an instantaneous gas rate while drilling, a cumulative PI, and lateral limits;

a second track plotting pressures including a bottom-hole pressure, a wellhead pressure, and a differential pressure between an expected reservoir pressure and the bottom-hole pressure;

a third track plotting a rate of penetration and a nitrogen pumping rate;

a fourth track plotting a choke size opening and formation tops associated with field geology descriptions; and a fifth track plotting micropal output.

20. The computer-implemented system of claim 17, wherein the geological formation information includes formation tops, formation dipping.

* * * * *